US008877045B1

(12) United States Patent
Bradley et al.

(10) Patent No.: US 8,877,045 B1
(45) Date of Patent: Nov. 4, 2014

(54) WATER TREATMENT APPARATUS

(75) Inventors: James Bradley, Ladoga, IN (US);
William Blythe, Vandalia, IL (US)

(73) Assignee: Bradley Innovation Group, LLC, Ladoga, IN (US)

( * ) Notice: Subject to any disclaimer, the term of this patent is extended or adjusted under 35 U.S.C. 154(b) by 235 days.

(21) Appl. No.: 13/595,563

(22) Filed: Aug. 27, 2012

Related U.S. Application Data

(63) Continuation-in-part of application No. 13/031,374, filed on Feb. 21, 2011, now Pat. No. 8,333,886, which is a continuation of application No. PCT/US2009/054522, filed on Aug. 20, 2009.

(60) Provisional application No. 61/090,396, filed on Aug. 20, 2008.

(51) Int. Cl.
*C02F 3/00* (2006.01)

(52) U.S. Cl.
USPC .................. 210/150; 210/220; 210/242.2

(58) Field of Classification Search
USPC ......................... 210/150, 220, 242.2
See application file for complete search history.

(56) References Cited

U.S. PATENT DOCUMENTS

| | | | |
|---|---|---|---|
| 2,275,428 A | 3/1942 | Haldeman | |
| 2,293,183 A | 8/1942 | Walker | |
| 2,335,756 A | 11/1943 | Haldeman | |
| 3,053,390 A | 9/1962 | Wood | |
| 3,295,681 A | 1/1967 | Rubert at al. | |
| 3,333,834 A | 8/1967 | Brewster | |
| 3,744,635 A | 7/1973 | Horvath | |
| 3,796,414 A | 3/1974 | Winton | |
| 3,933,640 A | 1/1976 | Kirk et al. | |
| 4,003,832 A | 1/1977 | Henderson et al. | |
| 4,086,306 A | 4/1978 | Yoshinaga | |
| RE30,038 E | 6/1979 | Sweeney | |
| 4,495,891 A | 1/1985 | Dugan et al. | |
| 4,559,902 A | 12/1985 | Mason et al. | |
| 5,158,037 A | 10/1992 | Englebart | |
| 5,178,093 A | 1/1993 | Reese et al. | |
| 5,205,237 A | 4/1993 | Skeggs et al. | |
| 5,294,335 A | 3/1994 | Chiang | |
| 5,397,466 A | 3/1995 | Lin | |
| 5,558,042 A | 9/1996 | Bradley et al. | |
| 5,565,096 A | 10/1996 | Phelan | |
| 5,660,142 A | 8/1997 | Van Rijn | |
| 5,951,922 A | 9/1999 | Mazzei | |
| 5,961,831 A | 10/1999 | Lee et al. | |

(Continued)

FOREIGN PATENT DOCUMENTS

| | | |
|---|---|---|
| JP | 63-171699 | 7/1988 |
| JP | 2001-212560 | 7/2001 |

*Primary Examiner* — Chester Barry
(74) *Attorney, Agent, or Firm* — Ice Miller LLP

(57) ABSTRACT

Embodiments of a water treatment unit are disclosed. An embodiment of a water treatment unit according to the present disclosure comprises a generally vertical riser having a lower end and an upper end, at least one inlet adjacent the lower end, and at least one outlet adjacent the upper end, a substantially spherical housing surrounding the riser, the housing comprising at least one opening in a lower portion of the housing, the housing enclosing a chamber, a motor coupled to the housing, a shaft coupled to the motor, the shaft extending downward from the motor within the riser, the shaft being in general axial alignment with the riser, at least one propeller coupled to the shaft, and a biomedia material within the chamber.

7 Claims, 10 Drawing Sheets

(56) References Cited

U.S. PATENT DOCUMENTS

| | | | |
|---|---|---|---|
| 6,041,738 A | 3/2000 | Hemauer et al. | |
| 6,056,873 A | 5/2000 | Hartley et al. | |
| 6,254,769 B1 | 7/2001 | Whittaker | |
| 6,318,292 B1 | 11/2001 | Sakai | |
| 6,447,681 B1 | 9/2002 | Carlberg et al. | |
| 6,499,431 B1 | 12/2002 | Lin et al. | |
| 6,561,134 B1 | 5/2003 | Mikami | |
| 6,584,935 B2 | 7/2003 | Zohar et al. | |
| 6,659,043 B1 | 12/2003 | Huska | |
| 6,722,314 B1 | 4/2004 | Crisinel et al. | |
| 6,764,597 B2 | 7/2004 | Chauquet | |
| 6,818,123 B2 | 11/2004 | Yano | |
| 6,962,019 B1 | 11/2005 | McDougle | |
| 7,024,814 B1 | 4/2006 | McDougle | |
| 7,029,577 B2 | 4/2006 | Cummins | |
| 7,052,601 B2 | 5/2006 | Gravdal | |
| 7,082,893 B2 | 8/2006 | Schreier | |
| 7,100,535 B2 | 9/2006 | Cattin et al. | |
| 7,134,293 B2 | 11/2006 | Rabal | |
| 7,162,831 B1 | 1/2007 | Morton et al. | |
| 7,293,658 B2 | 11/2007 | Cummins | |
| 7,329,351 B2 | 2/2008 | Roberts et al. | |
| 8,333,886 B2 * | 12/2012 | Bradley | 210/150 |
| 2006/0008865 A1 | 1/2006 | Cote et al. | |
| 2007/0032828 A1 | 2/2007 | Vago | |
| 2008/0143000 A1 | 6/2008 | Sun et al. | |
| 2009/0114592 A1 | 5/2009 | Lebrun et al. | |

* cited by examiner

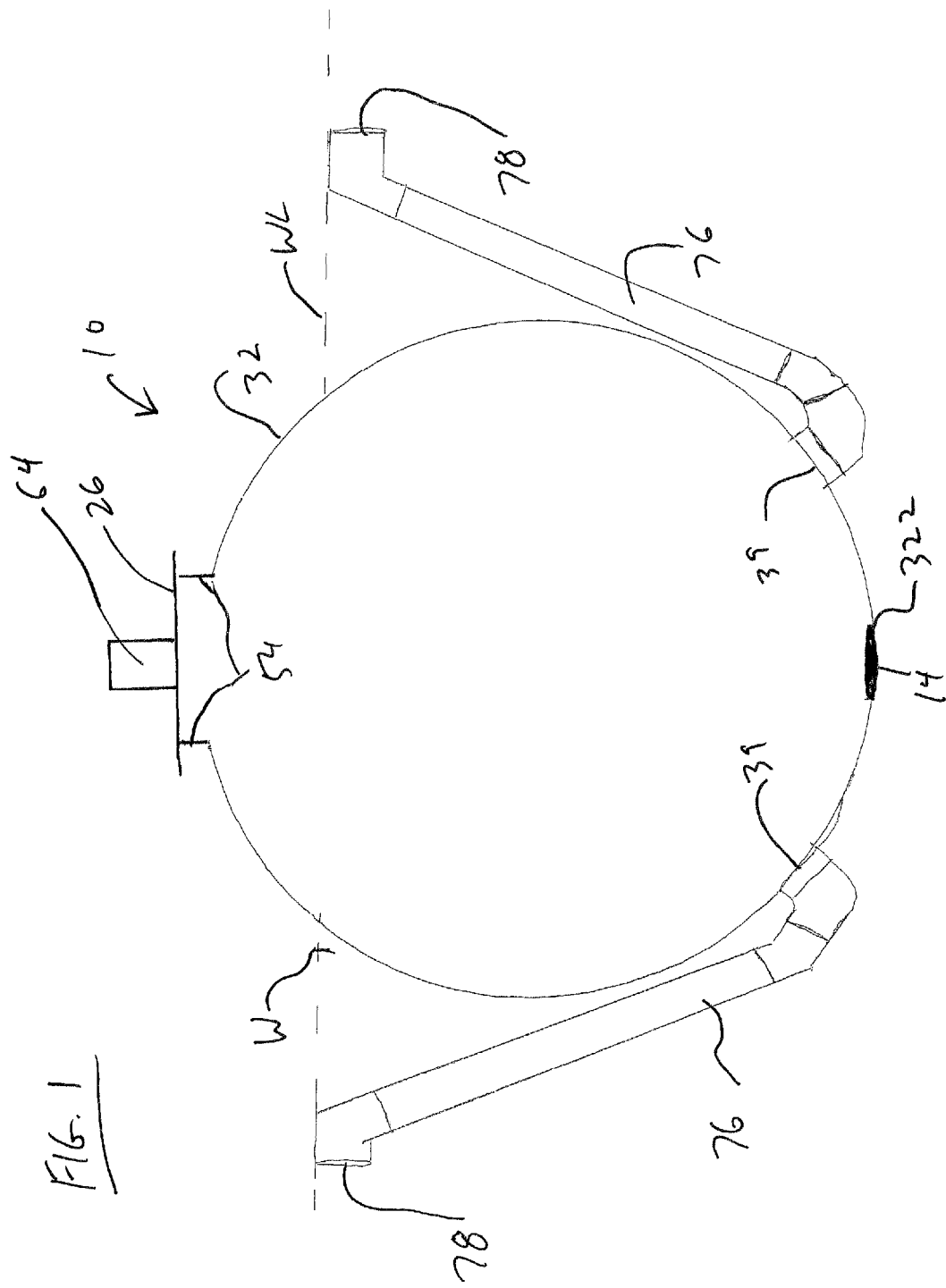

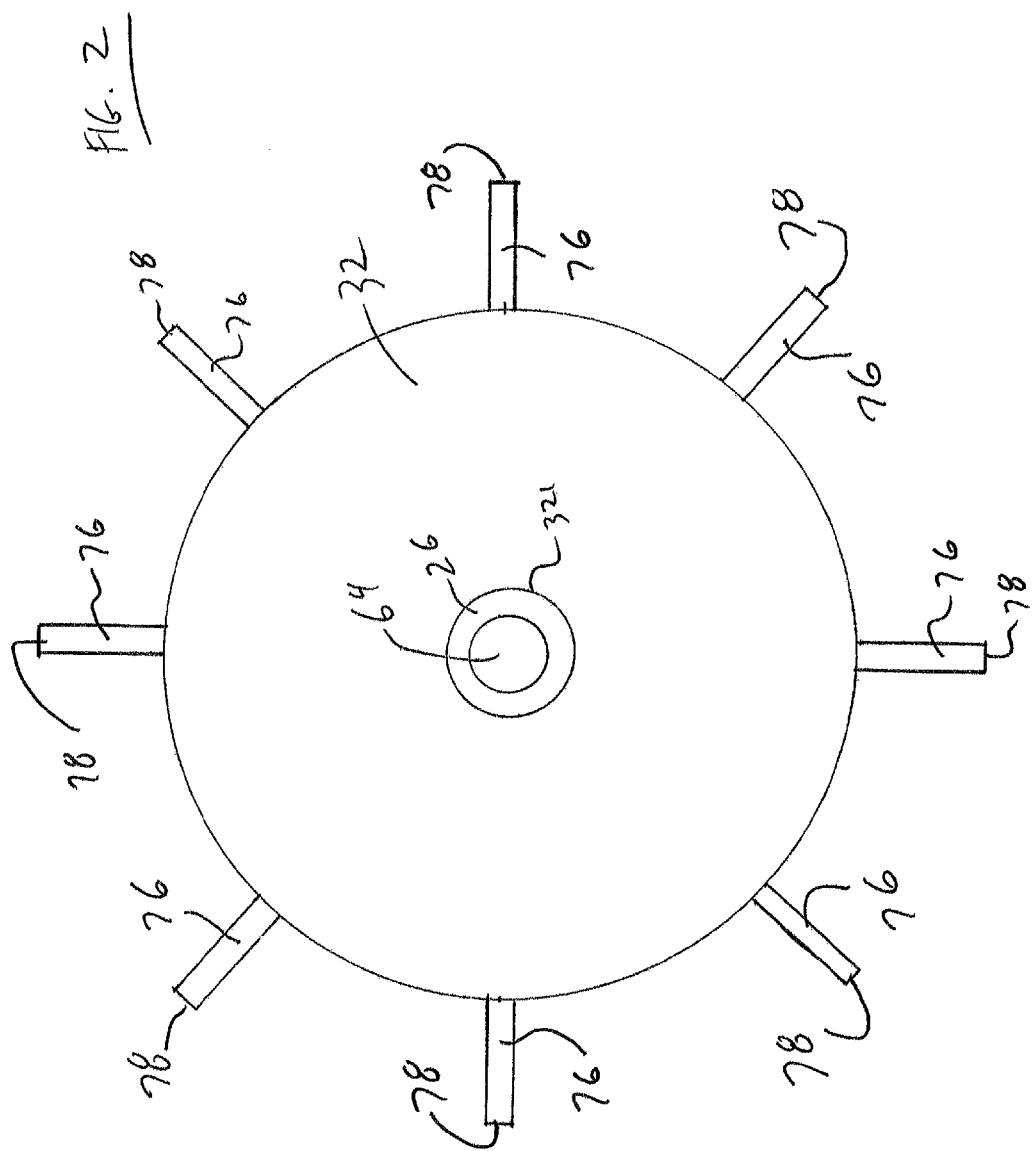

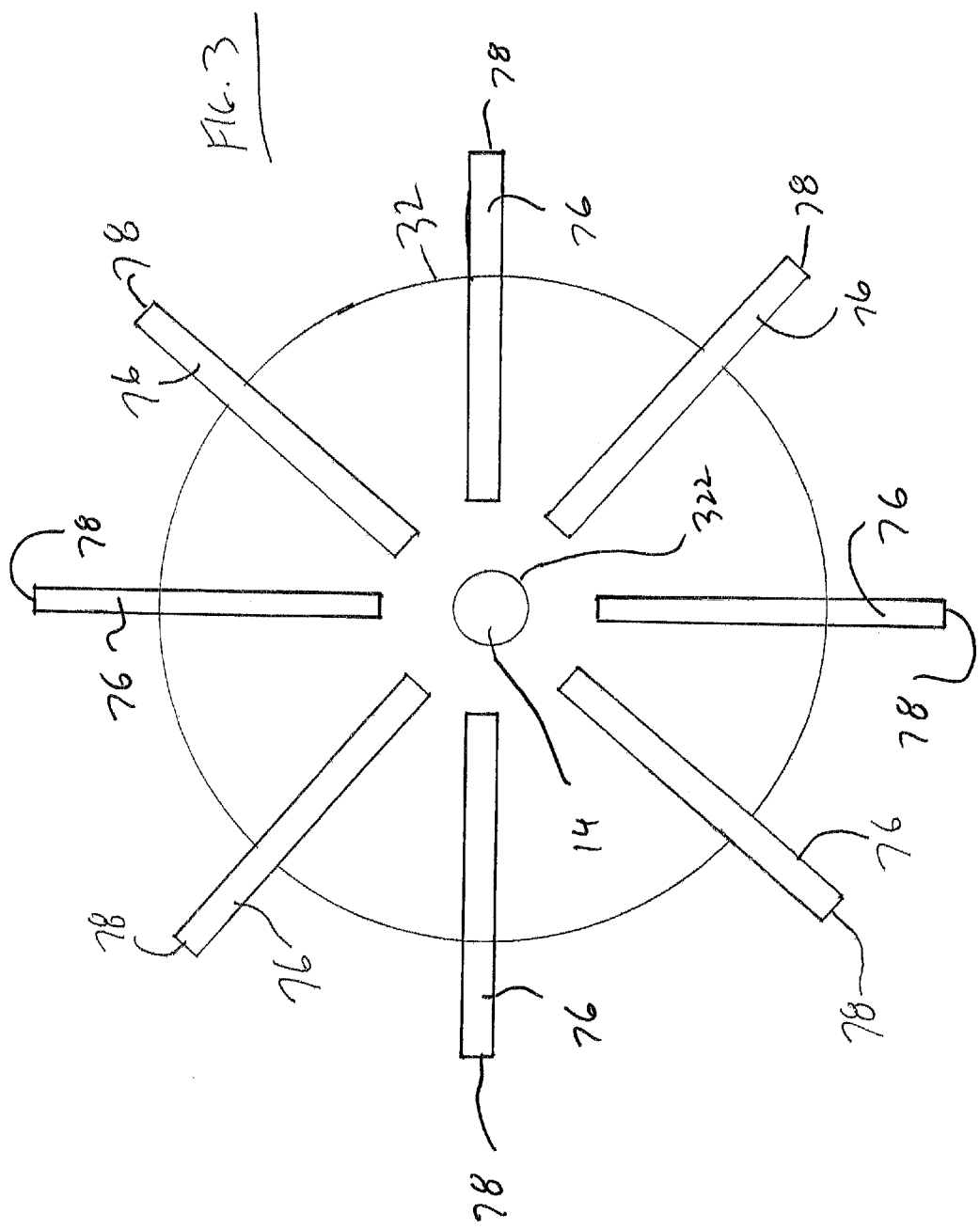

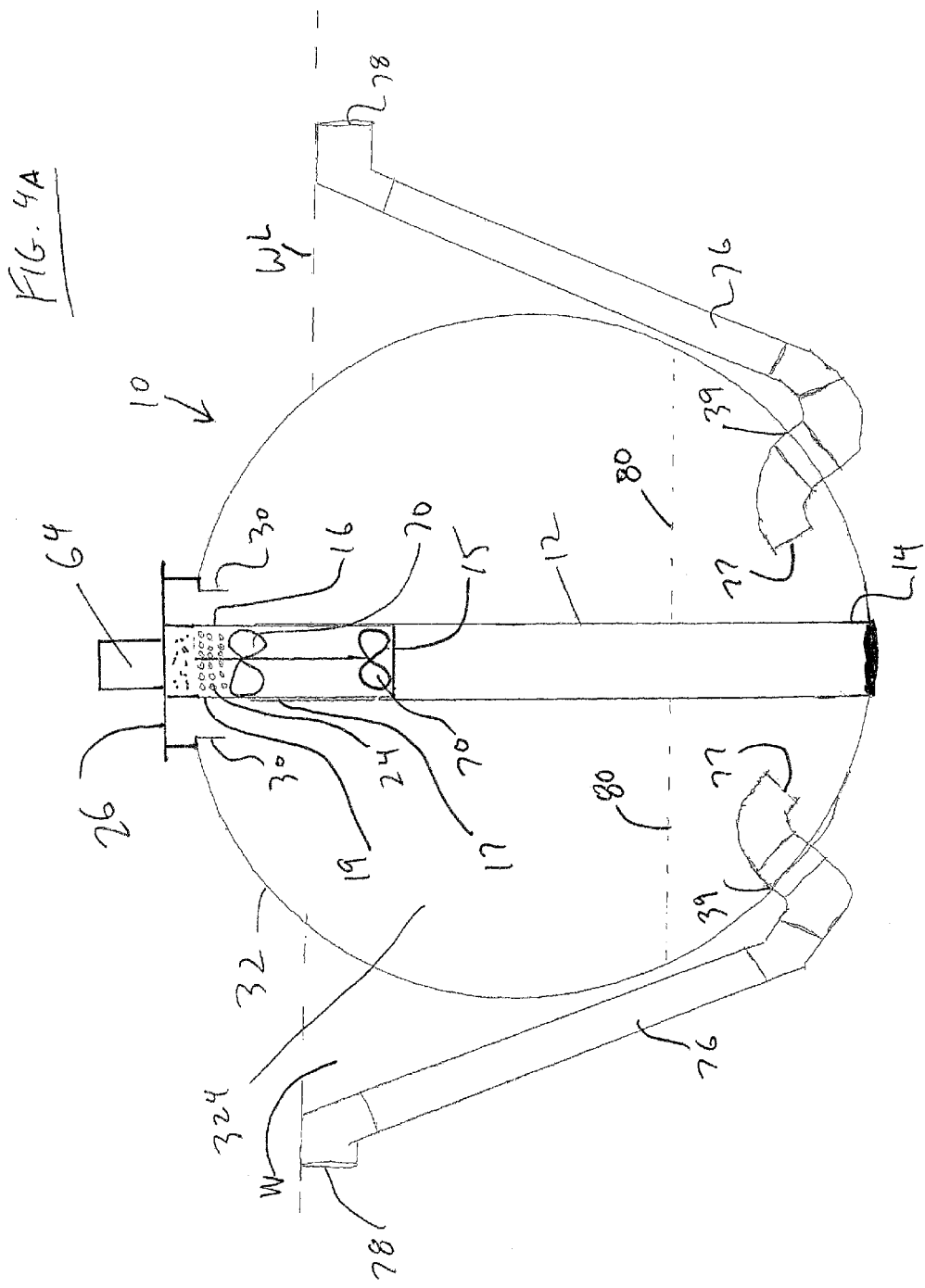

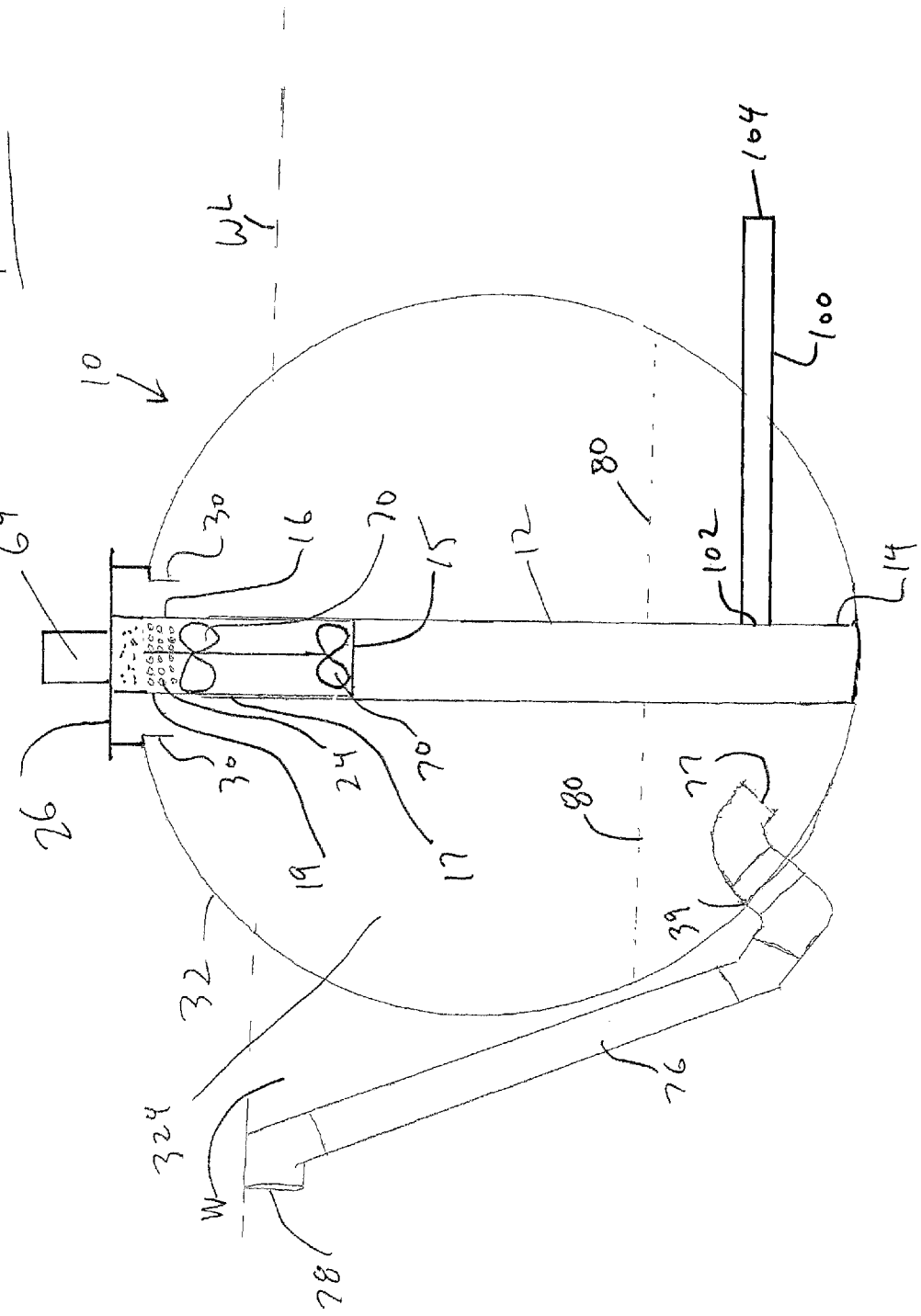

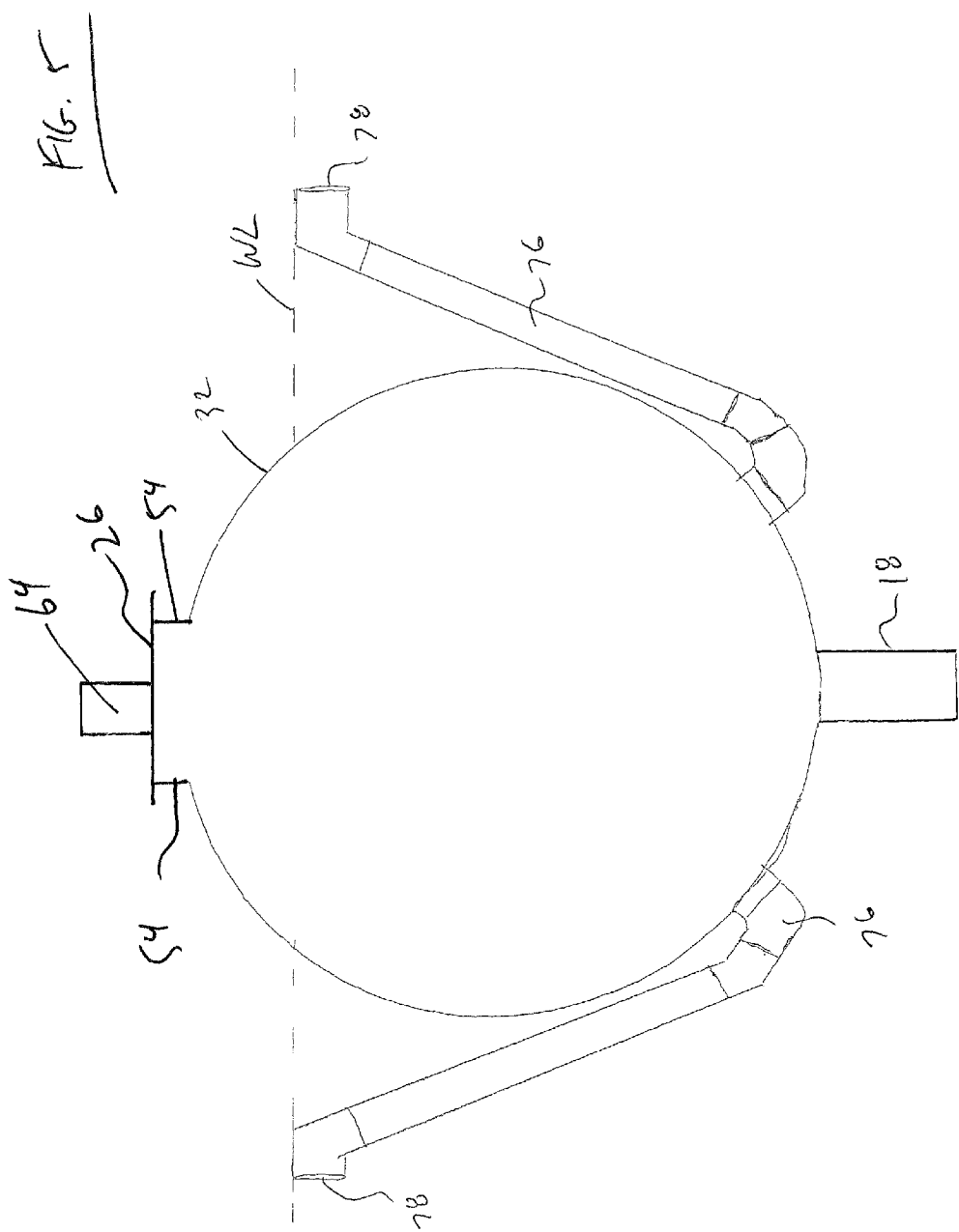

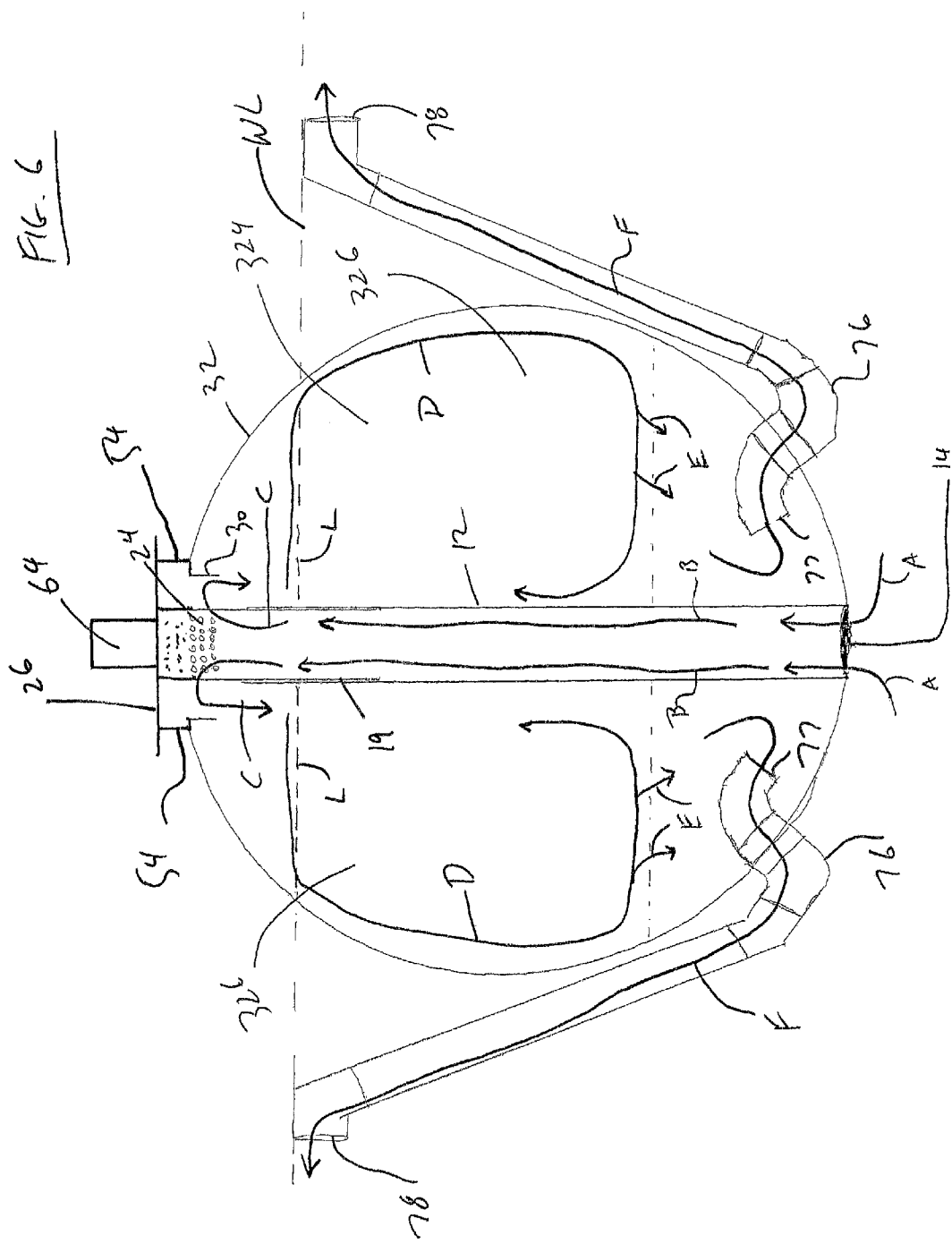

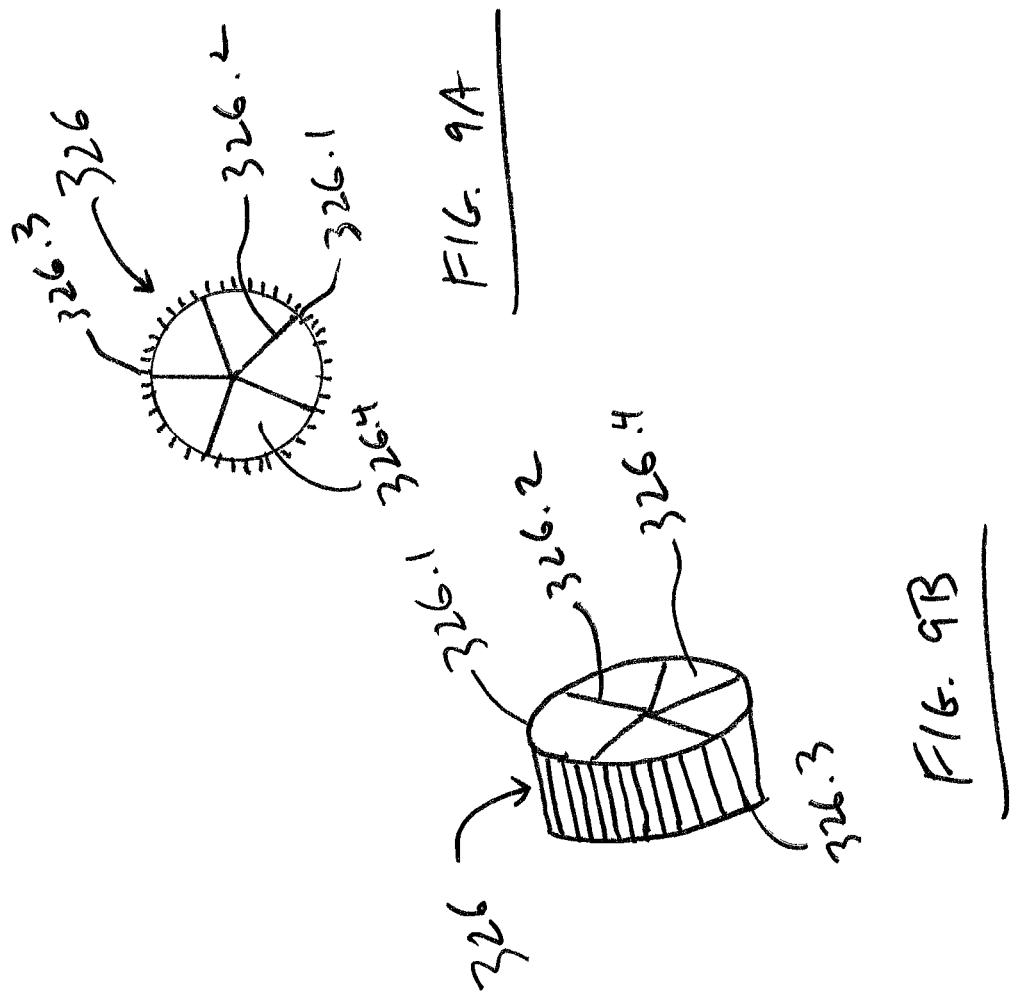

WATER TREATMENT APPARATUS

CROSS-REFERENCE TO RELATED APPLICATIONS

This application is a continuation-in-part of U.S. patent application Ser. No. 13/031,374 filed Feb. 21, 2011 now U.S. Pat. No. 8,333,886, which is a continuation of Patent Cooperation Treaty Patent Application Serial No. PCT/US09/054,522, filed Aug. 20, 2009, which claims priority to U.S. Provisional Patent Application Ser. No. 61/090,396 filed Aug. 20, 2008. The entire disclosure of each of the foregoing applications is incorporated herein by reference.

BACKGROUND

Wastewater from municipal sewage systems, large-scale agricultural operations, and industrial waste product systems often includes large amounts of organic and inorganic waste material that, if left untreated, can create severe odors due to anaerobic decay and can generate toxic products. Treating such waste generally involves collecting the organic and inorganic waste material in a stream of liquid or water, and collecting the waste in settling pools, ponds, or lagoons. Thereafter, the waste is allowed to settle in progressive settling ponds, pools, or lagoons, and any floating detritus is allowed to decompose, allowing the effluent to be run off relatively free of the debris for further treatment or clarification. During this process, the addition of oxygen sufficient to meet the basic oxygen demand is preferred so that the waste material in the water will undergo biodegradation that converts the wastewater into a relatively nontoxic, non-offensive effluent. Since anaerobic decomposition is inefficient as compared to aerobic decomposition, and anaerobic decomposition often results in the production of a malodorous sulfur-containing gas, it is preferred to add oxygen to the wastewater to increase decomposition while reducing or eliminating the existence of anaerobic decomposition. Various approaches have been used, typically by surface aeration or by submerged aeration systems wherein air is pumped below the surface of the water, or sometimes by a rotating impeller that mixes the wastewater and entrains air into that water. While each of these previous designs may have application in that have been considered and developed, there is still a need for an improved apparatus for economically mixing a large quantity of wastewater with sufficient air to at least satisfy the basic oxygen demand of the wastewater to promote biodegradation of the waste materials, and/or to reduce or eliminate offgassing of offensive odors.

SUMMARY

The present disclosure includes disclosure of embodiments of a water treatment unit that can be situated in a body of water such as a tank, pool, pond, lagoon, or lake. In at least one embodiment, a water treatment unit according to the presnt disclosure comprises a generally vertical riser having a lower end and an upper end, at least one inlet adjacent the lower end, and at least one outlet adjacent the upper end; a substantially spherical housing surrounding the riser, the housing comprising at least one opening in a lower portion of the housing, the housing enclosing a chamber; a motor coupled to the housing; a shaft coupled to the motor, the shaft extending downward from the motor within the riser, the shaft being in general axial alignment with the riser; at least one propeller coupled to the shaft; and a biomedia material within the chamber. In at least one embodiment, a water treatment unit according to the presnt disclosure comprises a discharge pipe passing through a at least one opening in the water treatment unit. In at least one embodiment, such a discharge pipe is directionally adjustable. In at least one embodiment, a water treatment unit according to the presnt disclosure comprises at least one propeller in proximity of at least one outlet in the water treatment unit. In at least one embodiment, a water treatment unit according to the presnt disclosure comprises at last one propeller for entraining air bubbles into water within the water treatment unit. In at least one embodiment, a water treatment unit according to the presnt disclosure comprises at least one buoyant member operable to maintain the water treatment unit at a predetermined level relative to a body of water in which it is placed. In at least one embodiment, a water treatment unit according to the presnt disclosure comprises at least one extension structure coupled to an inlet in the water treatment unit.

BRIEF DESCRIPTION OF THE DRAWINGS

The features and advantages of this disclosure, and the manner of attaining them, will be more apparent and better understood by reference to the following descriptions of the disclosed methods and systems, taken in conjunction with the accompanying drawings. The components in the figures are not necessarily to scale, emphasis instead being placed upon illustrating the principles of the disclosure. Moreover, in the figures like referenced numerals designate corresponding parts throughout the different views, but not all reference numerals are shown in each of the figures.

FIG. 1 is a side view of a water treatment unit according to at least one embodiment of the present disclosure.

FIG. 2 is a top view of a water treatment unit according to at least one embodiment of the present disclosure.

FIG. 3 is a bottom view of a water treatment unit according to at least one embodiment of the present disclosure.

FIG. 4A is a cut-away side view of a water treatment unit according to at least one embodiment of the present disclosure.

FIG. 4B is a cut-away side view of a water treatment unit according to at least one embodiment of the present disclosure.

FIG. 5 is a side view of a water treatment unit according to at least one embodiment of the present disclosure.

FIG. 6 is a cut-away side view of a water treatment unit according to at least one embodiment of the present disclosure.

FIG. 9A is a side view of a plastic biomedia material used in at least one embodiment of the present disclosure, FIG. 9B is a perspective view of a plastic biomedia material used in at least one embodiment of the present disclosure.

DESCRIPTION

Figure 7:
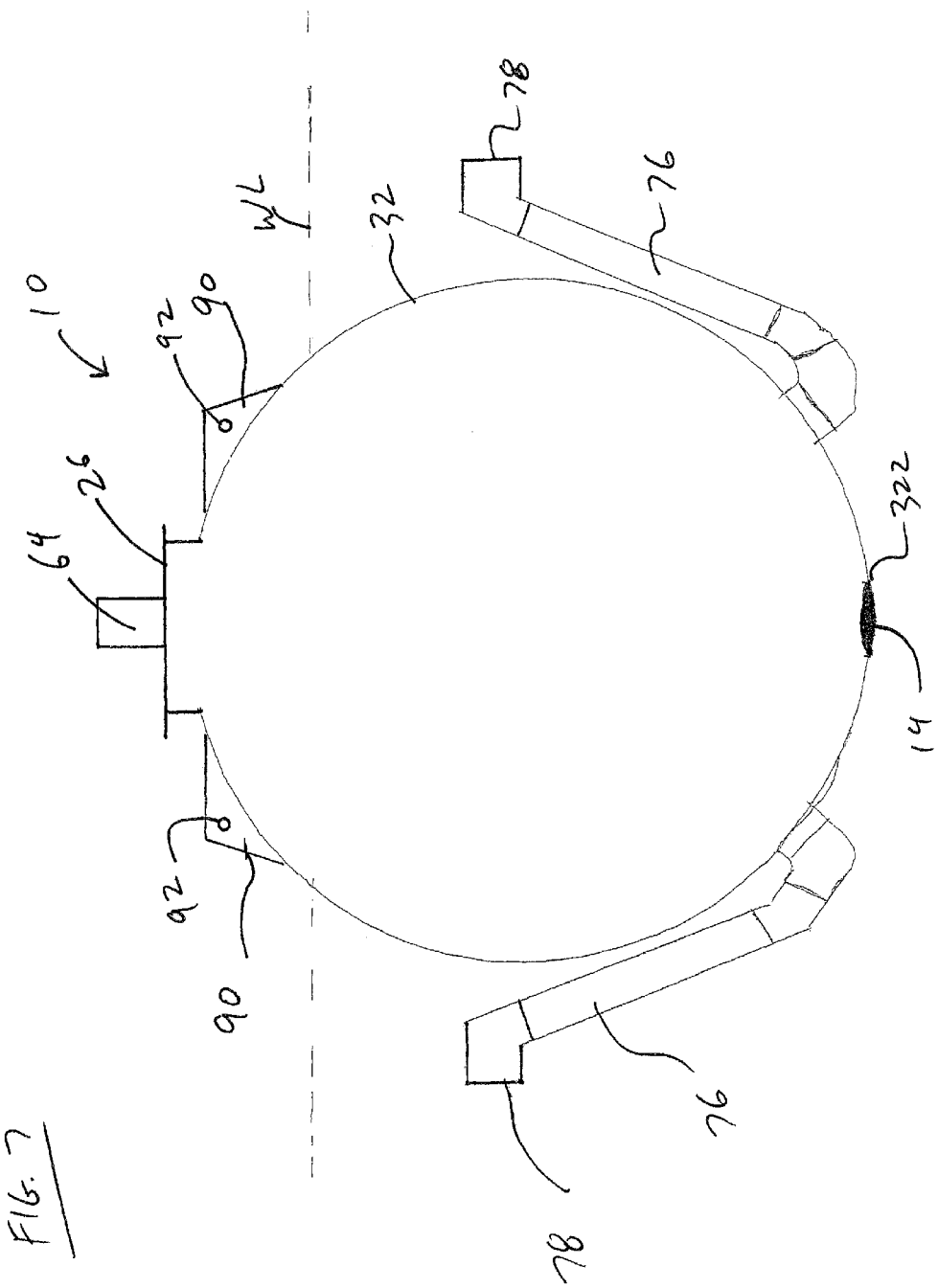
FIG. 7 is a side view of a water treatment unit according to at least one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Turning now to FIGS. 1-9B, according to at least one embodiment of the present disclosure, a water treatment unit 10 comprises a housing 32, and at least one riser 12 within housing 32. According to at least one embodiment of the present disclosure, housing 32 comprises a substantially spherical housing optionally fabricated from plastic, corrosion-resistant metal (including, for example, galvanized steel, enamel-coated steel, aluminum, or stainless steel), or other materials known in the art to resist degrading when exposed to water for extended periods of time. In at least one embodiment, housing 32 comprises a substantially spherical housing between about 72-78 inches in diameter. Housing 32 comprises an upper opening 321, a lower opening 322, and at least one discharge opening 39. Housing 32 encloses mixing chamber 324.

According to at least one embodiment of the present disclosure, riser 12 comprises a lower end 14 and an upper end 17. Riser 12 is optionally fabricated from plastic, corrosion-resistant metal (including, for example, galvanized steel, enamel-coated steel, aluminum, or stainless steel), or other materials known in the art to resist degrading when exposed to water for extended periods of time.

In at least one embodiment, mixing chamber 324 contains a plastic biomedia material 326. FIG. 9A shows a side view of a single piece of plastic biomedia material 326 used in at least one embodiment of the present disclosure. FIG. 9B shows a perspective view of a single piece of plastic biomedia material used in at least one embodiment of the present disclosure. As shown in FIGS. 9A-B, in at least one embodiment plastic biomedia material 326 comprises a substantially cylindrical shape comprising wall 326.1 and one or more cross-supports 326.2. The outer surface of wall 326.1 comprises a plurality of ridges 326.3 protruding outward from the outer surface of wall 326.1. The inner surface of wall 326.1 and cross-supports 326.2 define a plurality of open gaps 326.4 therebetween. In at least one embodiment, each piece of plastic biomedia material 326 is approximately one centimeter in diameter. In at least one embodiment, plastic biomedia material 326 comprises Kaldnes™ K-1 biomedia material. In at least one embodiment, chamber 324 contains approximately 100 cubic feet of plastic biomedia material 326. In at least one embodiment, plastic biomedia material 326 comprises a bacterial biofilm. In at least one embodiment, when exposed to water during the operation of water treatment unit 10, the bacterial biofilm is effective to remove ammonia from the water.

In at least one embodiment, chamber 324 comprises support 80 in the lower hemisphere of housing 32. According to at least one embodiment of the present disclosure, support 80 is a substantially rigid grille, screen, or mesh material. The openings through support 80 are sized to discourage plastic biomedia material 326 from passing therethrough, while allowing water to pass from the region of chamber 324 above support 80 (the "biomedia zone") to the region below support 80. In at least one embodiment, support 80 fits snugly against an inner surface of housing 32 so that plastic biomedia material 326 is discouraged from passing between support 80 and the inner surface of housing 32.

According to at least one embodiment of the present disclosure, a discharge pipe 76 is secured into each discharge opening 39. Each discharge pipe 76 comprise inlet 77 at one end and outlet 78 at the other end. According to at least one embodiment of the present disclosure, each inlet 77 resides inside chamber 324 in the region below support 80. Each inlet 77 optionally is fitted with a screen (not shown) so as to discourage the discharge of particles of biomedia material 326 from water treatment unit 10. Each outlet 78 exists outside of housing 32. In at least one embodiment of the present disclosure, a discharge pipe 76 may be adjustable to selectively determine the depth and direction of its outlet 78.

According to at least one embodiment, motor 64, such as an electric motor or any other properly sized and powered motor, engine, or other revolving powerplant, can be fixed to and supported by a cap 26, thereby allowing motor 64 and cap 26 to be removably attached to housing 32 by way of fasteners such as bolts, wing nuts, or other fastener means. Cap 26 fits over upper opening 321 of housing 32. The interface between cap 26 and housing 32 optionally comprises one or more openings 54 through which air can be drawn into the mixing chamber 324.

In at least one embodiment of the present disclosure, shaft 66 is connected to motor 64 and extends downward through cap 26 in general axial alignment with a pump barrel 19. Pump barrel 19 comprises a lower end 15 and an upper end 16, and is optionally fabricated from plastic, corrosion-resistant metal (including, for example, galvanized steel, enamel-coated steel, aluminum, or stainless steel), or other materials known in the art to resist degrading when exposed to water for extended periods of time. One or more water discharge outlets 24 are provided around upper end 16 of pump barrel 19. In at least one embodiment of the present disclosure, cap 26 can include a peripheral wall 30 that surrounds the upper end 16 of the pump barrel 19. In at least one embodiment of the present disclosure, lower end 15 of pump barrel 19 fits within upper end 17 of riser 12. In at least one such embodiment, a water-tight seal is established between lower end 15 of pump barrel 19 and upper end 17 of riser 12.

In at least one embodiment of the present disclosure, shaft 66 optionally is connected to motor 64 by a coupling member (not shown) that extends downward through cap 26. It will be appreciated that by utilizing cap 26 over the top of upper opening 321, motor 64, shaft 66, and propellers 70 are readily pulled from riser 12 to allow for inspection of components and general maintenance or repair of the equipment with minimal disassembly effort.

According to at least one embodiment of the present disclosure, at least one propeller 70 is coupled to shaft 66 and caused to rotate by the rotation of the motor 64, thereby creating an upward flow from a body of water outside waste treatment unit 10 into riser 12 and pump barrel 19. According to at least one embodiment, multiple propellers 70 are employed, whereby a first propeller 70 is included along shaft 66 nearer the lower end 15 of pump barrel 19, and a second propeller 70 is included along shaft 66 nearer upper end 16 of pump barrel 19. In at least one exemplary embodiment, second propeller 70 is positioned such that the propeller is at least partially exposed to air, thereby allowing second propeller to entrain air into the water or fluid flowing past second propeller 70 and into discharge outlets 24. According to at least one embodiment, second propeller is positioned relative to the height of the discharge outlets such that air is entrained into the water at a size less than 1.0 mm, less than 0.5 mm, less than 0.25 mm, less than 0.15 mm, or less than 0.1 mm in size for the given motor/propeller combination.

According to at least one embodiment of the present disclosure, riser 12 and pump barrel 19 are sized and shaped to be of a length and cross-sectional area as required by the necessary water flow, amperage requirements, and viscosity of wastewater of the environment into which water treatment unit 10 is deployed.

FIG. 4B shows an alternate embodiment of water treatment unit 10 of the present disclosure. The embodiment shown in FIG. 4B is designed for use in shallow water or for land-based use. In the embodiment shown in FIG. 4B, there is no lower opening 322 in housing 32. Instead, the embodiment shown in FIG. 4B comprises intake pipe 100 that extends through a wall of housing 32. Intake pipe 100 comprise first end 102 and second end 104. First end 102 is coupled to riser 12, and second end 104 is positioned outside of housing 32.

The operation of the water treatment unit 10 is illustrated in FIG. 6. As shown in the exemplary embodiment of FIG. 6, waste treatment unit 10 is placed in a body of water such that riser 12 extends downward to a desired depth below water level WL. It will be appreciated that the lower portion 14 of riser 12 may be of a design and construction that allows the addition of extension 18 (as shown in FIG. 5), such as, for example, one or more segmented tubes or other extension structures, such as PVC piping, stainless steel piping with threaded extensions, or other such extension structures that extend below the outer circumference of housing 32, effectively extending the depth of riser 12 to a user-determined level. Through the use of such extension structures, stratified layers of water in a pond, pool, tank, or lagoon can be specifically targeted to be drawn up through riser 12 for oxygenation and displacement, thereby allowing water in the lower areas of a pond, pool, tank, or lagoon to be drawn up, oxygenated, and discharged.

It will be appreciated that when motor 64 is powered on, water or the fluid in the pond, pool, tank, or lagoon is drawn into lower end 14 of the riser 12 (arrows A) and propelled upward through the riser 12 into pump barrel 19 (arrows B) by one or more propellers 70 (shaft 66 and propellers 70 are not shown in FIG. 6 for purposes of clarity). The water or fluid exits the pump barrel 19 through outlets 24 into chamber 324 (arrows C).

The flow of fluid into the chamber 324 creates turbulence in the biomedia zone, causing the biomedia material 326 to move within the fluid in chamber 324. In at least one embodiment of waste treatment 10 according to the present disclosure, the water and biomedia material 326 in the biomedia zone inside chamber 324 moves in the general direction shown by arrows D in FIG. 6. Movement of the biomedia material 326 in the turbulent fluid inside chamber 324 enhances the exposure of the bacteria on the surface of the biomedia material 326 to the undesirable material in the fluid inside chamber 324. The substantially spherical shape of chamber 324 increases the turbulence in the biomedia zone inside chamber 324. In at least one embodiment, the operation of water treatment unit 10 is effective to remove ammonia from the fluid inside chamber 324.

The size and structure of the riser 12, pump barrel 19, motor 64, and propellers 70 are selected so that between about 600 to about 1000 gallons of water per minute can be pumped through the riser 12 and pump barrel 19 into the mixing chamber 324. In at least one embodiment of waste treatment 10 according to the present disclosure, the flow of water into the chamber 324 generally causes the fluid surface level L within the chamber 324 to be slightly higher than the water surface surrounding the chamber, thus providing a hydraulic pressure forcing the fluid through support 80 (arrows E), into the discharge pipes 76 (arrows F), and out of outlets 78. Furthermore, fluid surface level L within chamber 324 may be manipulated by a user such that the pressure therein is increased, thereby allowing greater amounts of oxygen to be transferred. For example, the surface level L may be manipulated to increase sufficient to create a hydraulic pressure equal to approximately at least 1.1 atmospheres, at least 1.2 atmospheres, at least 1.3 atmospheres, or at least 1.4 atmospheres hydraulic pressure, thereby entraining more oxygen therein.

As fluid cascades out of discharge outlets 24, into chamber 324, and exits through discharge pipes 76, the direction and depth at which the oxygenated fluid is discharged can be determined the optional adjustment of discharge pipes 76, which may be adjustable to selectively determine the depth and direction of outlets 78. By selecting the direction of pipes 76, the fluid outflow from waste treatment unit 10 can at least partially oppose or offset the rotation of the treatment unit 10 caused by the torque provided when the motor 64 is running. It will be appreciated that, by selectively placing outlets 78 for dispelling oxygenated water from the waste treatment unit 10, a more consistently oxygenated lagoon can be developed by developing both inward and outward flow currents that adequately disperse oxygenated water and intake low oxygenated water, thereby allowing permeation of oxygen throughout the lagoon without creating a turbulent flow of water that precludes the settling of organic matter that is required in clarification or settling tanks or lagoons. Further, due to the fact that flow can be directed with relative precision and with relatively low pressure, a reduced amperage may be required to operate motor 64, thereby resulting in increased energy efficiency. Finally, it will be appreciated that the use of directional flow allowing slower water transfer to occur further allows the use of propeller speeds to entrain air while not dispersing bacterial colonies known as flock. Additionally, it will be appreciated that utilizing the flow direction discharge pipes 76, water brought up from warmer strata in the winter may be utilized to help eliminate ice build-up on the surface of outdoor lagoons, which further allows for additional oxygenation of the lagoon.

In at least one embodiment waste treatment unit 10 according to the present disclosure, housing 32 comprises a plurality of mounting flanges. Shown in FIG. 7 are mounting flanges 90 on housing 32 according to one embodiment. In the embodiment shown in FIG. 7, mounting flanges 90 are located so as to be above the water line WL. However, other embodiments of housing 32 may comprise mounting flanges at or below the water line WL when waste treatment unit 10 is in a body of water W. As shown in FIG. 7, in at least one embodiment of the present disclosure each mounting flange 90 comprises a through-hole 92.

Figure 8:
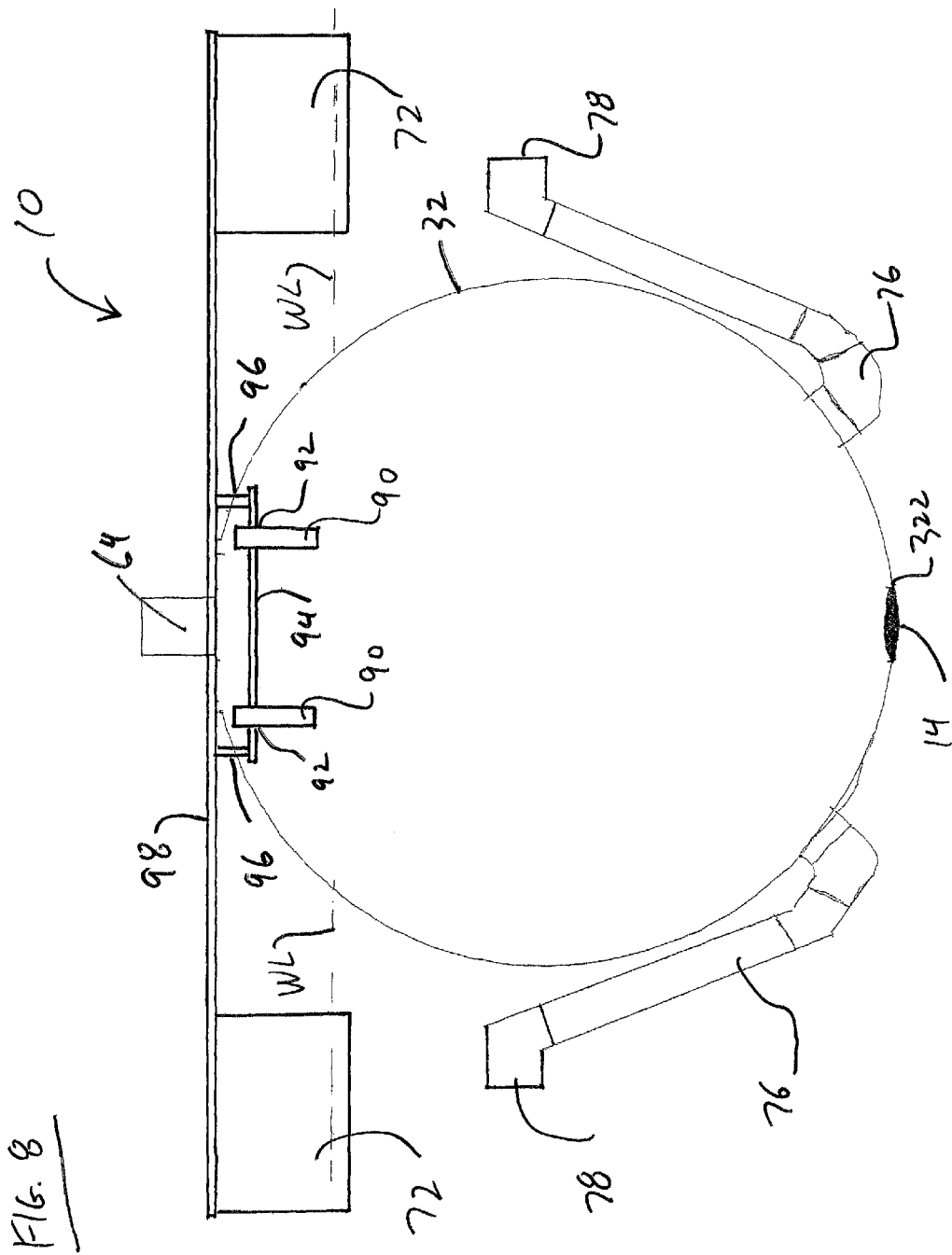
FIG. 8 is a side view of a water treatment unit according to at least one embodiment of the present disclosure.

According to at least one embodiment of the present disclosure, at least one buoyant member 72 may be attached to waste treatment unit 10 to cause waste treatment unit to sit at a predetermined level in a body of water W. FIG. 8 is a side view of a water treatment unit according to at least one embodiment of the present disclosure including a plurality of buoyant members 72. As shown in FIG. 8, rigid strut 94 is inserted into through-holes 92 of mounting flanges 90. A plurality of vertical supports 96 are affixed at or near either end of rigid strut 94. A supporting member 98 is affixed to the plurality of vertical supports 96, and at least one buoyant member 72 is attached at or near either end of supporting member 98. It will be appreciated that the level at which waste treatment unit 10 sits in body of water W may be different for different embodiments of waste treatment unit 10, and may depend on the application for which waste treatment unit 10 is utilized. It will be appreciated that buoyant member 72 can take many forms, including foam filled buoys, adjustable air filled bladders, or any other buoyant material. Additionally, two or more torque lines (not shown) can be connected to the housing 32 to prevent rotation of the treatment unit 10 when the motor 64 is running.

FIG. 4B shows an alternate embodiment of water treatment unit 10 of the present disclosure. The embodiment shown in FIG. 4B is designed for use in shallow water or for land-based use. In the embodiment shown in FIG. 4B, there is no lower opening 322 in housing 32. Instead, the embodiment shown in FIG. 4B comprises intake pipe 100 that extends through a wall of housing 32. Intake pipe 100 comprise first end 102 and second end 104. First end 102 is coupled to riser 12, and second end 104 is positioned outside of housing 32. In operation, when motor 64 is powered on, water or the fluid in the pond, pool, tank, or lagoon is drawn into second end 104 of intake pipe 100, and then into riser 12. For purposes of clarity, only one intake pipe 100 is shown in FIG. 4B. However, embodiments of water treatment units of the present disclosure may comprise any number of intake pipes 100 necessary to meet the capacity desired. In at least one embodiment of the present disclosure, two or more water treatment units of the type disclosed in FIG. 4B may be connected together whereby the effluent from a first such water treatment unit flows directly into the intake pipe(s) of another water treatment unit.

While these features have been disclosed in connection with the illustrated preferred embodiment, other embodiments of the disclosure will be apparent to those skilled in the art that come within the spirit of the disclosure as defined in the following claims. Further, it will be appreciated that in very large ponds or lakes, it may be convenient or necessary to employ two or more water treatment units 10 to ensure a total water flow volume sufficient to provide sufficient oxygen to satisfy the basic oxygen demand of the body of water and/or to remove ammonia from of the body of water.

What is claimed is:

1. A water treatment unit for treating water, said treatment unit comprising:
   a generally vertical riser having a lower end and an upper end, at least one inlet adjacent said lower end, and at least one outlet adjacent said upper end;
   a substantially spherical housing surrounding said riser, said housing comprising at least one opening in a lower portion of said housing, said housing enclosing a chamber;
   a motor coupled to said housing;
   a shaft coupled to said motor, said shaft extending downward from said motor within said riser, said shaft being in general axial alignment with said riser;
   at least one propeller coupled to said shaft; and
   a biomedia material within said chamber.

2. The water treatment unit of claim 1, further comprising:
   a discharge pipe passing through said at least one opening.

3. The water treatment unit of claim 2, wherein said discharge pipe is directionally adjustable.

4. The water treatment unit of claim 1, wherein at least one of said at least one propeller is placed in proximity of said at least one outlet.

5. The water treatment unit of claim 1, wherein at least one of said at least one propeller entrains air bubbles into water within said riser.

6. The water treatment unit of claim 1, further comprising:
   at least one buoyant member operable to maintain said water treatment unit at a predetermined level relative to a body of water in which it is placed.

7. The water treatment unit of claim 1, further comprising:
   at least one extension structure coupled to said inlet.

* * * * *